(12) United States Patent
Trobradovic et al.

(10) Patent No.: US 12,140,185 B2
(45) Date of Patent: Nov. 12, 2024

(54) METHOD AND SYSTEM FOR LUBRICATING ONE OR MORE ROTARY BEARINGS

(71) Applicant: SDT INTERNATIONAL SA-NV, Brussels (BE)

(72) Inventors: Haris Trobradovic, Zagreb (HR); Charles Machado, Chaulnes (FR)

(73) Assignee: SDT INTERNATIONAL SA-NV, Brussels (BE)

( * ) Notice: Subject to any disclaimer, the term of this patent is extended or adjusted under 35 U.S.C. 154(b) by 167 days.

(21) Appl. No.: 17/905,936

(22) PCT Filed: Feb. 25, 2021

(86) PCT No.: PCT/EP2021/054738
§ 371 (c)(1),
(2) Date: Sep. 8, 2022

(87) PCT Pub. No.: WO2021/180485
PCT Pub. Date: Sep. 16, 2021

(65) Prior Publication Data
US 2023/0143292 A1   May 11, 2023

(30) Foreign Application Priority Data
Mar. 10, 2020  (EP) .................................... 20162123

(51) Int. Cl.
*F16C 19/52*   (2006.01)
*F16C 33/66*   (2006.01)
(Continued)

(52) U.S. Cl.
CPC .......... *F16C 33/6659* (2013.01); *F16C 19/52* (2013.01); *F16C 33/6625* (2013.01);
(Continued)

(58) Field of Classification Search
CPC .. F16C 19/52; F16C 33/6603; F16C 33/6622; F16C 33/6625; F16C 33/6659;
(Continued)

(56) References Cited

U.S. PATENT DOCUMENTS 5,060,760 A   10/1991  Long et al.
6,339,961 B1 *  1/2002  Goodman .............. G01N 29/14
                                                              73/644
(Continued)

FOREIGN PATENT DOCUMENTS

DE   102013100988 A1   7/2014
EP      0399323 A1   11/1990
(Continued)

OTHER PUBLICATIONS

Extended European Search Report mailed Oct. 13, 2020, in connection with European Patent Application No. 20162123.2, filed Mar. 10, 2020, 7 pgs.
(Continued)

*Primary Examiner* — Phillip A Johnson
(74) *Attorney, Agent, or Firm* — Chiesa Shahinian & Giantomasi PC

(57) ABSTRACT

According to the method of the invention, a lubricant is supplied incrementally to a rotary bearing while the bearing is in operation rotating at a rotational speed. The lubricant is supplied in consecutive steps so that at each step a portion of a prescribed amount of lubricant is supplied, followed each time by an ultrasound measurement. A first ultrasound measurement is performed before the first supply step, and starting from the second supply step, each measurement result is compared at least to the previous result, in order to evaluate the bearing condition and decide on that basis whether to continue the sequence or not. Stopping the sequence is decided when the lubrication of the bearing is assessed as successful, a lubrication failure or over-lubrication.

14 Claims, 13 Drawing Sheets

(51) Int. Cl.
*F16C 41/00* (2006.01)
*F16N 29/02* (2006.01)

(52) U.S. Cl.
CPC .............. *F16C 41/00* (2013.01); *F16N 29/02* (2013.01); *F16C 2233/00* (2013.01); *F16N 2210/14* (2013.01); *G01N 2291/101* (2013.01)

(58) Field of Classification Search
CPC ...... F16C 41/00; F16C 2233/00; F16N 29/02; F16N 2210/14; G01N 2291/101
See application file for complete search history.

(56) References Cited

U.S. PATENT DOCUMENTS

| | | |
|---|---|---|
| 9,353,908 B2 | 5/2016 | Kuvaja et al. |
| 10,197,044 B2 | 2/2019 | Czichowski et al. |
| 2003/0047386 A1 | 3/2003 | Sherrington |
| 2012/0145482 A1 | 6/2012 | Ifield et al. |
| 2017/0276651 A1* | 9/2017 | Hall ........................ G01N 29/11 |
| 2019/0257360 A1 | 8/2019 | Meenakshisundaram et al. |

FOREIGN PATENT DOCUMENTS

| | | | | |
|---|---|---|---|---|
| EP | 0806602 A1 | | 11/1997 | |
| EP | 0704654 B1 | | 12/2001 | |
| EP | 1505270 A1 | * | 2/2005 | ............... F01M 1/08 |
| FR | 3009057 A1 | | 1/2015 | |
| JP | 2001511886 A | * | 8/2001 | |
| JP | 2005-351363 A | | 12/2005 | |
| KR | 20170060302 A | | 6/2017 | |

OTHER PUBLICATIONS

International Search Report and Written Opinion mailed Feb. 6, 2021, in connection with International Patent Application No. PCT/EP2021/054738, filed Feb. 25, 2021, 12 pgs.

\* cited by examiner

METHOD AND SYSTEM FOR LUBRICATING ONE OR MORE ROTARY BEARINGS

CROSS-REFERENCE TO RELATED APPLICATIONS

This application is a national stage under 35 U.S.C. 371 of International Patent Application Serial No. PCT/EP2021/054738, filed Feb. 25, 2021, which claims priority to European Patent Application No. 20162123.2, filed Mar. 10, 2020, the disclosures of all of which are incorporated herein by reference in their entirety.

FIELD OF THE INVENTION

The present invention is related to the monitoring and lubrication of rotary bearings applied in rotating machinery.

STATE OF THE ART

Bearings equip most industrial assets and remain the main cause of damage that may affect the operation of rotating equipment. An unexpected failure of a bearing causes an undesired breakdown of production, resulting in unexpected losses that are responsible for increasing costs and involving unplanned downtime. One of the main root causes of failure is abnormal wear and deterioration of moving parts, resulting from problems related to lubrication. The bearing provides a mechanical connection function of guiding the rotating parts, while supporting and transmitting forces with minimal friction. In order to ensure or even to extend the predefined service life of a piece of equipment, while keeping in step with production costs, the evolution of vibration technics, acoustic, thermal or electrical monitoring techniques does not currently address the real problem, concerning lubrication management.

The main causes of bearing failures are a lack of lubricant, an excessive renewal of lubricant due to inappropriate periodicity and/or quantity, contamination, etc. Hence, it is essential to maintain an optimal regime of lubrication in order to increase reliability and to limit failures.

Empirical studies have resulted in generic formulas for establishing a lubrication program. Today, it is a common practice to resort to a strategy of periodically lubricating the bearing. It is generally considered that 30% of the empty space in a bearing must be occupied with lubricant to optimize its operation. Manufacturers have developed empirical approaches to calculate amounts of lubricant to be periodically injected as well as relubrication intervals.

For example, to calculate the grease quantity for bearings, the bearing's geometrical dimensions and the intended method are required. Bearing manufacturer SKF prescribes the following:

replenishment quantity G=0.005 D B, if relubrication from the side of the bearing, G=0.002 D B, if relubrication through holes in the center of the inner or outer ring, where G is the grease quantity in grams to be added when replenishing the bearing, D is the outside diameter of the bearing in millimeters, B is the width of the bearing in millimeters. This formula is widely accepted as the best way to calculate grease quantity.

Once the required grease quantity has been calculated, it is necessary to determine how often to apply that amount of grease. The relubrication interval is defined as a regreasing frequency. The calculation requires a machine's operating conditions and additional bearing information. A preferred way of determining the greasing frequency is as follows:

$$T = K * \left[ \left( \frac{14 * 10^6}{n * \sqrt{d}} \right) - 4 * d \right] \quad (1)$$

where T is the time interval between two greasing operations (in hours), N is the rotating speed in [rpm], d is the bore diameter of the bearing (in millimetres). K denotes a corrective factor that is a function of the operating conditions. K is the product of factors respectively determined by temperature, contamination, moisture, vibration, position and bearing design. The values of these factors are available in literature. Typically no sensors are required.

The evaluation of the couple {G, T} for each bearing makes it possible to define a lubrication planning. The proposed formulas are the result of empirical tests carried out by the bearing manufacturers. It should be noticed that these estimations can differ from one manufacturer to another. In the field, when several, such as tens, hundreds, and even thousands of bearings are subjected to be greased periodically, the associated logistic is to be considered as an important source of errors. This can be improved by modern applications dedicated to traceability, such as the one proposed in US 2019/257360.

Nevertheless, existing lubrication methods based on empirical formulas such as given above, do not offer a good level of satisfaction. The lubrication procedure is often carried out 'blindly', i.e. without quantifying and personalizing the real need for the lubricant, because it requires physical measurements provided by sensors followed by a decision tool. In most cases and maybe for wrong safety reasons, the greasing operation is realized too early, which results in excessive lubrication known as over-lubrication, causing thermal and mechanical stresses harmful to the rotating equipment.

To overcome these limitations, it is increasingly frequent to resort to automatic and centralized relubrication. Automatic lubricators often distribute a measured and/or prescribed amount of lubricant to the bearing based on a defined timed interval. This kind of device offers an interesting advantage where access to positions is difficult, or where equipment is operated remotely with no local maintenance staff. Some examples of automatic lubricators are given in documents EP 0 704 654 B1 and EP 0 806 602 A1. However, these systems do not include sufficient verification of the result of the supplied lubricant. It is possible that the lubricant does not reach the rolling interface due to obstruction, leakage or excess lubricant in the housing, etc. The physical and/or tribological properties of the lubricant could also be corrupted due to oxidation, contamination by foreign particles or simply because of lubricant ageing. Moreover, two identical bearings in different operating conditions or mountings may have potentially different lubricant consumptions.

Existing automatic lubrication devices equipped with pressure and/or temperature sensors are described in US2012/145482 and in EP 0 399 323 E1. The pressure sensor is supposed to detect obstruction or leakage along the grease pipe. As described before, these devices inject a prescribed amount, typically a constant amount, of grease at predefined intervals regardless of the real requirement. Other devices equipped with vibration sensors, tachometers and/or other sensors are described in U.S. Pat. Nos. 10,197,044 A1, 9,353,908 and FR3009057, where indicators extracted from analysis, i.e. vibration analysis, are supposed to detect the lubrication state of a bearing in operation. These systems are based on vibration measurements, typically performed at low frequency [10 Hz, 1000 Hz]. Often given in velocity unit (typically RMS velocity), the scalar result of this vibrational measurement is composed of a combination of several vibrational modes. These signatures are by nature much more energetic than those affecting friction in a bearing and therefore, they mask the evolution of the lubrication regimes and their possible consequences. These systems are therefore often not capable of detecting specific bearing lubrication-related issues. DE102013100988 and US2003/0047386 disclose other lubricator systems quantifying the lubricant film thickness in operation from an ultrasound echo resonance method, or from the variation of electrical properties of the lubricant. Due to a large variability of applications, this approach requires amongst others complex settings, calibration procedures assuming values as targets to reach a satisfying optimal lubricant regime and potential retrofitting, which may limit the scalability of the entire lubrication system.

More successful lubrication monitoring systems, such as assisting lubrication systems, are based on ultrasound measurements. Handheld ultrasound lubrication condition monitors are well known in the art and a range of such devices have been developed by the applicant. These devices comprise a piezo-electric transducer mounted on a resonant structure, for example in the range of 20-100 kHz (ultrasound domain), which when mounted in contact with a rotating bearing for measuring the vibration or vibroacoustic response generated by the bearing, exhibits a high sensitivity within a relevant ultrasound domain suitable for lubrication. The excitation of the resonance frequency enables the detection of high frequency phenomena related to the lubrication condition, such as rolling friction and defect impacts. An audible rendering deduced from heterodyned transformation is often provided, in real time, as a subjective and passive decision tool where the user conserves the decision to add an unknown amount of lubricant. In order to be more objective and to improve the repeatability, the signal processing chain implemented in the above-named hand-held devices and used for the treatment, i.e. acquiring and filtering, of the signal produced by the transducer are also well-known in the state of the art. These processing methods are mainly configured to extract from the ultrasound signal a number of scalar indicators which are related to specific bearing conditions. A filter is applied in accordance with the transducer response to improve the sensitivity. The most important indicator is the root mean square (RMS) of the ultrasound signal, expressed in decibels (dB).

For a time signal x(t) composed of N samples $x_k$, regularly spaced, i.e. acquired, in time, depending on initial settings and the electronic embedded, the RMS value is defined as:

$$x_{(RMS)} = \sqrt{\frac{1}{N}\sum_{k=1}^{N} x_k^2} \text{ converted in } dBx_{(RMS)} = 20\log_{10}\left(\frac{x_{(RMS)}}{1\mu V}\right)$$

where 1 µV is the reference.

SUMMARY OF THE INVENTION

The invention aims to provide a solution to the above named problems. This aim is achieved by the method and system according to the appended claims. According to the method of the invention, a lubricant is supplied incrementally to a rotary bearing while the bearing is in operation, i.e. rotating at a given rotational speed. The lubricant is supplied in a sequence of consecutive steps so that at each step a sub-portion of a prescribed amount of lubricant is supplied to the bearing, followed each time by an ultrasound measurement. A first ultrasound measurement is performed before the first supply step, and starting from the second supply step, each measurement result is compared at least to the previous result, in order to evaluate the bearing condition and decide on the basis of this evaluation whether to continue the sequence or to stop the sequence. According to preferred embodiments, the stopping of the sequence is decided when the lubrication of the bearing is assessed as lubrication success, lubrication failure or overlubrication. In other words, the invention provides a method for monitoring and self-regulating, i.e. self-adjusting, the lubrication supply, expressed in the amount of lubricant to be injected. The invention is equally related to a system for lubricating one or more bearings, applying the method of the invention to each of said bearings.

The invention is in particular related to a method for monitoring and lubricating at least one rotary bearing of a machine, by incrementally supplying a lubricant to the bearing in one or several consecutive supply steps, and wherein:

a prescribed lubricant amount (G) is determined, before the first supply step, an ultrasound signal is measured through a transducer mounted in connection with the bearing, and an initial value (M0) of a scalar indicator that is representative of the (initial) lubrication condition of the bearing is extracted from the signal, and said measurement and value extraction is repeated after each subsequent lubricant supply step, wherein each measurement is performed after a stabilization period following the supply, the duration of the stabilization period being such that it allows the supplied lubricant to be fully operational, the amounts (gn) of lubricant supplied in the consecutive steps are smaller than the prescribed lubricant amount (G), starting with the second extracted value (M1), each value (Mn) of the scalar indicator is evaluated, with respect to the initial value (M0), and, starting from the third measurement, with respect to one or more of the previously extracted values (M1, M2, . . . , Mn−1), based on each of the evaluations, a decision is made about stopping or continuing the lubrication sequence.

Preferably, the decision about stopping or continuing the lubrication sequence is an automatic decision.

According to an embodiment, the prescribed lubricant amount (G) is used as a default value to initialize the method. According to a further embodiment, the prescribed lubricant amount (G) can be adjusted sequentially, depending on the ultrasound measurements performed between each step. The prescribed lubricant amount can be increased or decreased as a function of the successive measurements. For example, over time, the rotary bearing may need a higher amount of lubricant due to an abnormal level of friction revealed by ultrasound measurements, for example resulting from abnormal use, abnormal consummation or a leak through a seal or a pipe. The prescribed lubricant amount may then be increased to ensure a higher amount of lubricant being supplied to the rotary bearing, wherein the lubricant is supplied according to the invention.

According to an embodiment, the scalar indicator is the root mean square (RMS) of the signal.

According to an embodiment, the sequence is continued when an extracted value of the RMS is significantly lower than the previously extracted value. 'Significantly lower' or 'significantly higher' in the present context preferably means that the RMS is at least one dB lower or higher. 'Essentially the same' as a previous value in the present context preferably means that the RMS is within a range of −1 dB to +1 dB (including or excluding these values) compared to the previous value.

According to an embodiment, the sequence is continued when an extracted value is essentially the same as the previously extracted value, unless the extracted value has remained the same for a given number of consecutive measurements and value extractions, in which case the sequence is stopped and the lubrication condition is considered successful.

According to an embodiment, the sequence is stopped to avoid an overlubrication status when an extracted value is higher than the initial value (M0). Overlubrication, or an overlubrication status, typically takes place during the first steps of a sequence. Consequently, the amount of lubricant fed to at least one rotary bearing, at the moment of detection of overlubrication, is typically smaller than the prescribed lubricant amount (G).

According to an embodiment, the sequence is stopped due to a successful lubrication condition when an extracted value is significantly higher than the previous value, after said previous value was significantly lower than the value preceding said previous value.

According to an embodiment, the sequence is stopped due to a failed lubrication condition when an extracted value is significantly higher than the previous value, after said previous value was essentially the same as the value preceding said previous value.

According to an embodiment, the method further comprises an intermediate measurement of an ultrasound signal during the stabilization time after the first lubricant supply step, and before the first extraction of the scalar indicator value (M1), and the extraction of a value (M') of the scalar indicator from the intermediate signal, and wherein the sequence is stopped due to a suspected bearing failure if the value M' is significantly lower than the initial value (M0), whereas the first extracted value (M1) is significantly higher than the intermediately extracted value (M').

According to an embodiment, the scalar indicator or an additional scalar indicator is the Kurtosis.

The method may further comprise the determining of a replenishment interval (T), wherein the method according to the invention is performed multiple times at intervals equal to or shorter than the replenishment interval. Preferably, the replenishment interval (T) is an optimal replenishment interval.

According to an embodiment, the replenishment interval is updated in between subsequent applications of the lubrication method according to the invention, and wherein the update is based on the results of the steps of the lubrication method.

According to an embodiment, a shorter replenishment interval is applied when it is determined that a higher total amount of lubricant than the prescribed amount (G) is required before the lubrication sequence is stopped.

According to an embodiment, the method is fully automated.

The invention is equally related to a system for supplying lubricant to at least one rotating bearing, comprising:

A lubricant supply reservoir, provided with flow control device, for controlling the flow of lubricant out of the reservoir, At least one tube for feeding the lubricant from the reservoir towards the at least one rotating bearing, At least one transducer suitable for measuring an ultrasound signal, when the transducer is mounted in connection with the rotating bearing, A signal processing unit coupled to the at least one transducer and to the flow control device, and configured to calculate and store the value of a scalar indicator that is representative of the lubrication condition of the bearing, actuate or stop the flow from the reservoir to the bearing as a function of the evaluation of the value, in accordance with the method according to the invention, communicate information on the lubrication condition and/or the bearing condition towards a user of the system.

Advantageously, the system comprises at least one rotating bearing. Advantageously, the system of the invention comprises a sensor comprising the at least one transducer. Preferably, the transducer designates the sensitive part of the sensor. Advantageously, the sensor is suitable for measuring an ultrasound signal. Preferably, the sensor is mounted in connection with the rotating bearing.

Advantageously, the system is a system for self-regulating, i.e. self-adjusting, the lubricant supply to at least one rotating bearing. Preferably, the system is capable of self-regulating the lubricant supply to at least one rotating bearing. Advantageously, the system is capable of carrying out the method of the invention.

Advantageously, the signal processing unit (6) is further configured to acquire, filter and process the ultrasound signal in a defined frequency range. Preferably, the ultrasound signal is acquired, filtered and processed prior to calculating and storing the value of a scalar indicator that is representative of the lubrication condition of the bearing.

Preferably, flow from the reservoir to the bearing is regulated into a sequential amount of lubricant (gn) as a function of the ultrasound value.

Preferably, the information that is communicated comprises data and the status of the lubrication condition and/or the bearing condition. Preferably, the information is communicated to a software system, and/or to the user of the system.

The system of the invention can operate without human assistance while maintaining traceability of the automated decisions. The use of relevant scalar indicators allows to replace human decision making. The use of relevant scalar indicators further allows the system to properly self-regulate the amount of lubricant fed to at least one rotary bearing. The system therefor comprises a regulation loop, comprising a bi-directional and interactive exchange between the flow control of lubricant and ultrasound consequences.

According to an embodiment, the system is configured to operate automatically.

BRIEF DESCRIPTION OF THE FIGURES

FIGS. 6a to 6e are examples of the measured RMS values in a number of possible sequences according to the flowcharts of FIG. 5a.

DETAILED DESCRIPTION OF THE INVENTION

According to preferred embodiments, the method of the invention is performed repeatedly during a period of active service of a machine comprising one or more rotary bearings, the method being applied on each of said bearings. For a bearing of given dimensions, and rotating at a given speed, the interval T between required lubricant replenishments may be calculated in accordance with existing methods, preferably by the formula (1) given above. Also, a prescribed amount G of lubricant that is to be supplied at each replenishment is calculated in a manner known as such, and referred to above. However, instead of supplying the full amount G, the method of the invention provides an incremental supply of sub-portions of G, monitored by consecutive ultrasound measurements configured to determine the influence of each sub-portion on the bearing condition. Hence, the method of the invention allows self-adjustment of the actual required amount of lubricant from the prescribed amount of lubricant (G).

Figure 1A:
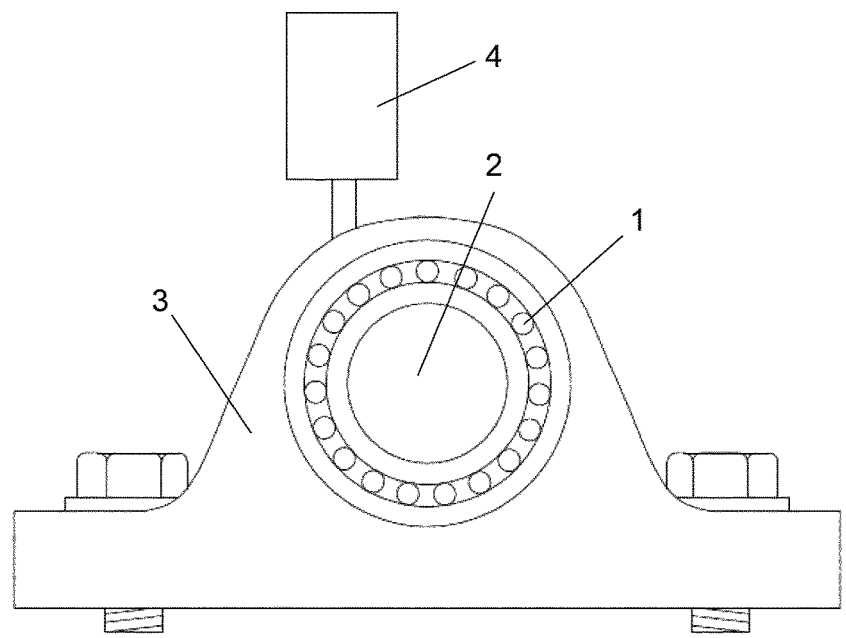
FIGS. 1a and 1b illustrate a system for supplying a lubricant to a bearing and for performing ultrasound measurements of the bearing's lubrication condition.
Figure 1B:
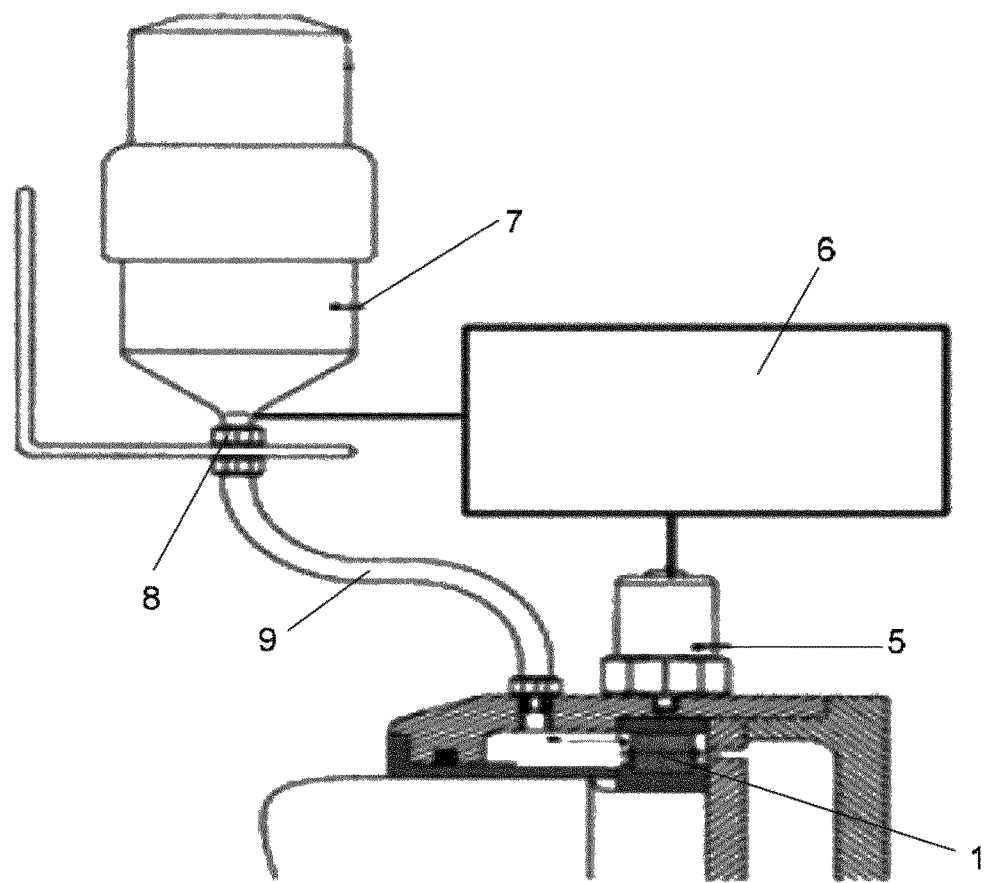

The method of the invention is preferably performed in an automated way, by a "smart" automatic lubrication system according to the invention, as illustrated in FIGS. 1a and 1b. FIG. 1a schematically illustrates a rotary bearing 1 supporting a rotatable axle 2 of a piece of machinery 3. The system 4 is configured to supply the lubricant, for example a grease of a given viscosity, to the bearing, and for performing and evaluating the ultrasound measurements. FIG. 1b shows the components of the system 4: a piezo-electric transducer 5 suitable for performing ultrasound measurements, a signal processing unit 6, and a lubricant supply reservoir 7 provided with a flow control mechanism 8 for regulating the flow out of the reservoir 7 and into the bearing, through a supply tube 9. The signal processing unit 6 is configured to extract one or more scalar indicators, such as the RMS value, representative of the lubrication condition of the bearing, from an ultrasound signal produced by the transducer 5. The electronic signal processing components present in the processing unit 6 may be in accordance to known designs, as implemented for example in hand-held ultrasound lubrication monitors which are part of the state of the art. The signal processing unit 6 is furthermore configured to evaluate the measurements and to control the sequence of supply steps in accordance with the method of the invention. The unit 6 is also configured to communicate data on the bearing and/or lubrication condition to the user of the system, for example by showing messages on a screen (not shown). A system according to the invention may be configured to lubricate several bearings placed at different locations on the machine or on several machines. A single processing unit may be configured to monitor the lubrication state of a plurality of bearings and control the lubricant flow from a single reservoir to the multiple bearing locations. The flow control mechanism may comprise a pump for directing the flow of lubricant to the bearing locations. The system may comprise multiple transducers, some or all of which may be mounted permanently on the bearing locations.

Contrary to prior art methods requiring a target value of lubricant at an imposed periodicity, the method of the invention uses an algorithmic convergence. The algorithmic convergence results in a replenishment process performed step-by-step by means of a self-regulating loop. Consequently, the amount of lubricant fed to the rotary bearing is an optimal amount of lubricant, established by direct measurements, whereas prior art methods often rely on indirect measurements, such as the thickness of the lubrication film, or human decisions.

Figure 2:
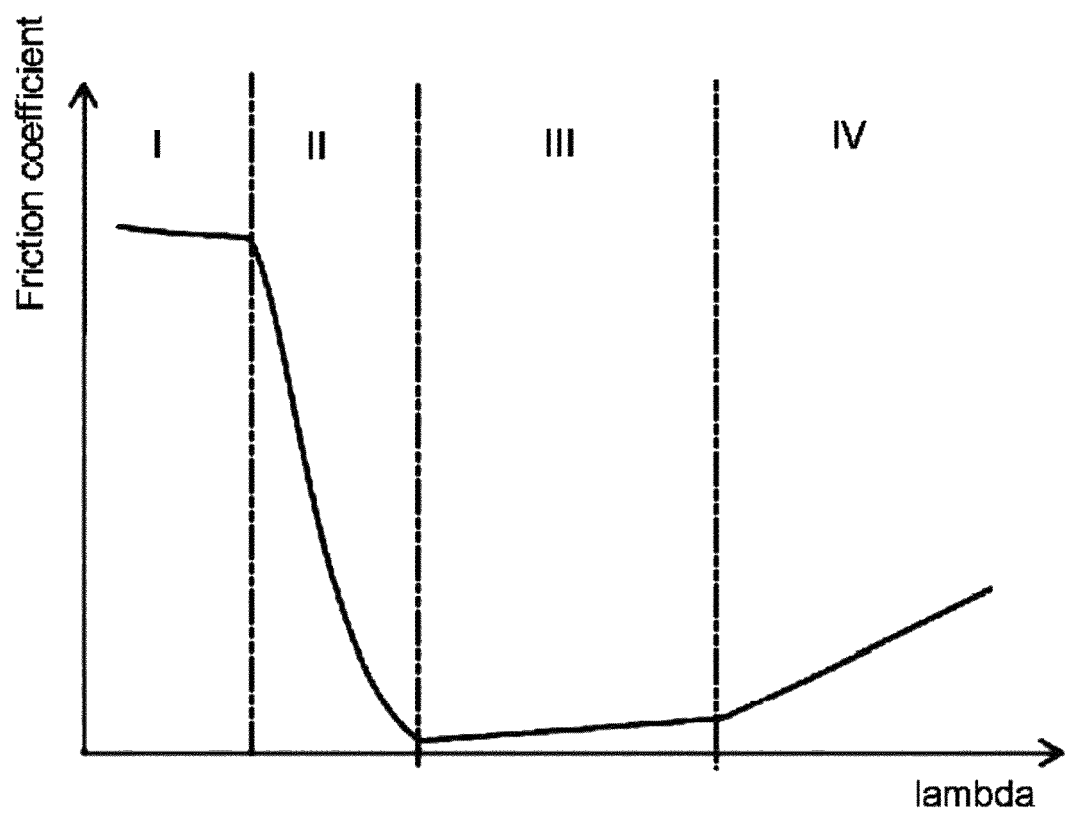
FIG. 2 is a generic image of the shape of the Stribeck curve for non-conformal contacts, expressing different lubrication regimes of a bearing.

The sequence of lubricant supply steps according to the invention is equivalent to a decision tree algorithm that is rooted in the Stribeck curve that is well-known in the domain of tribology. A schematic view of the general appearance of the Stribeck curve for non-conformal contacts is illustrated in FIG. 2. The Stribeck curve for conformal contacts has a similar general shape, and the invention is applicable to bearings in which either conformal or non-conformal contacts occur. The curve illustrates a friction coefficient as a function of a dimensionless lubrication-related scalar indicator, i.e. a scalar indicator that increases when more lubricant is present in the interface between contacting surfaces, preferably contacting surfaces in the bearing. This may for example be the specific dimensionless film thickness (lambda) which expresses the ratio between a lubricant film thickness between contacting surfaces within the bearing, and the roughness of the contacting surfaces. The friction coefficient is a function of the friction forces affecting the bearing, for example between the rolling surfaces of the spheres of a ball bearing relative to the inner and outer race of the bearing. The Stribeck curve is characterised by the appearance of four operational regions, indicated by numerals I, II, III, and IV in FIG. 2:

I: Boundary lubrication: Solid surfaces come into direct contact, the load is supported mainly by surface asperities (metal-metal contact) resulting in high friction. This region is typical for a severely underlubricated bearing.

II: Mixed lubrication: Some asperity contacts occur; the load is supported by both asperities and the viscous lubricant, resulting in important variability of friction. This region characterizes the change in behaviour when an underlubricated bearing is supplied with lubricant: the roughness is gradually covered by the lubricant, as this lubricant is added (going from left to right along the curve), and the friction coefficient decreases quickly as the lubricant film thickness increases.

III: fluid lubrication by an elasto-hydrodynamic (EHD) thin film which characterizes an optimal regime.

IV: fluid lubrication by a hydrodynamic regime (full film-HD).

Regions III and IV are characterised by a negligible asperity contact; the load is mainly supported by the lubricant due to the lift, pressure, the physical properties of the lubricant, etc. The friction coefficient is low in the EHD region but increases gradually as a function of the ratio film thickness/ roughness in the HD region. The EHD region is considered the ideal operational regime of the bearing. The graph shown in FIG. 2 is merely an example of a Stribeck curve. Details may vary for each bearing. For example the rate of change of the friction coefficient in the EHD and HD regions may differ from the curve shown in FIG. 2.

The relubrication interval T is calculated as described in the preceding paragraph, and is dependent on empirically determined factors, which depend on temperature, moisture, contamination of the bearing etc. The replenishment amount G is equally determined based on empirical formulae. Nevertheless, the actual lubricant requirement of a bearing can never be estimated correctly in all circumstances by these two empirical values T and G, but may be influenced by factors which are variable in time, or which are typical for the particular constructional details of the machinery in which a bearing is installed. For this reason, the supply of G at intervals T may in some circumstances lead to an underlubrication or an overlubrication of the bearing, or it may prohibit the detection of a malfunctioning bearing.

The present invention answers to this problem by not supplying the full amount of G at once, but by supplying the lubricant in a stepwise fashion, preferably by self-adjusting the amount of lubricant in a stepwise fashion, accompanied by ultrasound measurements to verify the effect of the consecutive additions of lubricant. A number of ultrasound-based scalars, in particular the RMS, are representative of the frictional behaviour of the bearing, as expressed by the Stribeck curve. The inventors have found therefore, that for a bearing that is assumed to operate correctly and that requires a replenishment of the lubricant, the method of the invention allows to supply the lubricant in such a way that the Stribeck curve is followed from left to right, until a point is reached where the bearing operates in the EHD regime, or in the lower area of the HD regime. In addition, specific embodiments of the method allow to detect a suspected malfunctioning of the bearing, a lubrication failure or an overlubrication of the bearing, by detecting a behaviour that deviates in an inadmissible manner from the Stribeck curve. The method of the invention does not require the exact knowledge of the Stribeck curve for the bearing on which the method is applied, but applies a decision logic that is based on the general trend observable in any Stribeck curve, for example a downward trend in region II followed by an upward trend in regions III and IV. When overlubrication is detected, the prescribed lubricant amount (G) can be automatically adjusted, here reduced, to avoid overlubrication in a next sequence. Alternatively or additionally, when overlubrication is detected, the initial time interval (T) can be automatically increased.

Figure 3:
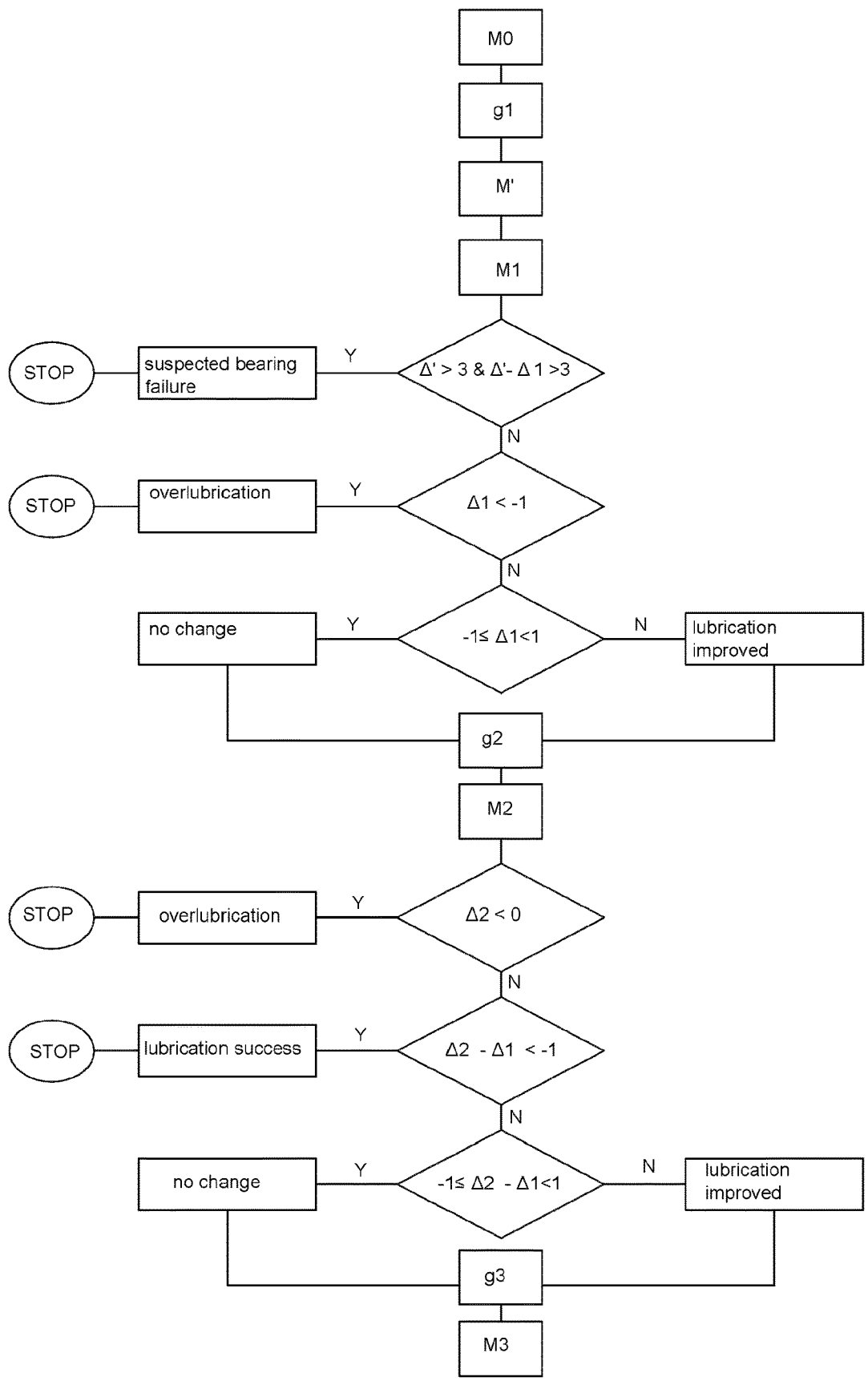
FIG. 3 is a flowchart of the initial sequences of the method of the invention, according to an embodiment of said method.

A preferred embodiment of a decision tree algorithm according to the invention is described in detail hereafter. The following description is however not limiting the scope of the present patent application. FIG. 3 shows a flow chart that represents the first steps of the method according to the preferred embodiment, performed on a rotating bearing using the installation shown in FIGS. 1a and 1b. For the bearing in question, the parameters T and G are determined. The sequence starts not longer than T seconds after a previous replenishment of the bearing with the lubricant. The sequence may be started earlier than T seconds after the last replenishment, for example at a ratio such as 0.5 T or 0.7 T. This may be decided when defining initial settings for applying the method. The ratio of T may also be changed during the lifetime of the bearing, in accordance with the results of the sequences applied in accordance with the invention. Additionally, the data storage of the system may be used as well to adjust the initial settings for applying the method.

The sequence starts with an initial ultrasound measurement, yielding an RMS value M0, measured in voltage units and expressed in dB(μV) where the reference voltage V0 is 1 μV). M0 is stored in a memory incorporated in or coupled to the processing unit 6. Then, an amount g1 of lubricant equal to 0.25 G is supplied to the bearing, through the supply tube 9, by opening the flow control mechanism 8 in a controlled manner. A stabilization time is determined, preferably based on empirical and scientific data, so that after this stabilization time has elapsed, the added lubricant is assumed to be fully operational within the bearing. The stabilization time may be calculated as a function of the bearing speed parameter, defined as $$n_\omega = \frac{(d+D)}{2}\omega$$

in [mm/min], wherein d and D are inner and outer diameters (in mm) of the bearing, and ω is the rotational speed of the bearing (in rpm), according to the following table:

| $n_\omega$ (mm/min) | Stabilization time (s) |
|---|---|
| =<46000 | 18 |
| ∈ ]4600, 52000] | 16 |
| ∈ ]52000, 58000] | 14 |
| ∈ ]58000, 64000] | 12 |
| ∈ ]64000, 70000] | 10 |
| ∈ ]70000, 76000] | 8 |
| >76000 | 7 |

During the stabilization time, an intermediate RMS value M' is measured, i.e. before reaching the stabilized operational regime. The value M' is preferably determined by calculating RMS values which are refreshed at short intervals, for example 250 ms, throughout the stabilization time. At the end of the stabilization time, the minimum value of the acquired RMS values is kept in memory to be used in the decision tree algorithm as the value M'.

Then at or shortly after the moment when the stabilization time has elapsed, a further RMS value M1 is measured, representing the lubrication condition in the stabilized bearing following the addition of g1. The following differential scalars are then calculated and stored:

$\Delta 1 = M0 - M1$ $\Delta' = M0 - M'$

And the following evaluations are made in accordance with the flowchart of FIG. 3:

If $\Delta'>3$ & $\Delta'-\Delta_1>3$, the bearing condition is assessed as malfunctioning. This corresponds to a case where M' is more than 3 dB lower than M0 and M1, i.e. the RMS value drops more than 3 dB and rises again more than 3 dB during the stabilization interval. The sequence is stopped at this point and the bearing is inspected.

If $\Delta 1<-1$, the bearing condition is assessed as 'overlubricated': M1 is more than 1 dB higher than M0. As the normal Stribeck trend is downward as a function of a thicker lubrication film, the upward trend indicates that no additional grease is required and the process is stopped, after which the bearing is preferably inspected.

The next verification step, if the condition is not assessed as 'overlubricated', is whether or not the condition '−1≤$\Delta_1$<1' is fulfilled. If not, this means that $\Delta_1$≥1, i.e. M1 is at least 1 dB lower than M0. In this case, it is considered that the lubrication condition has improved, and that a further amount of lubricant may be added. If the condition '−1≤$\Delta_1$<1' is fulfilled, this means that M1 is within a range of minus 1 dB or plus 1 dB with respect to M0, i.e. the lubrication condition has not significantly changed. The status 'no change' is registered, and the sequence also proceeds to a further addition of lubricant.

Figure 4A:
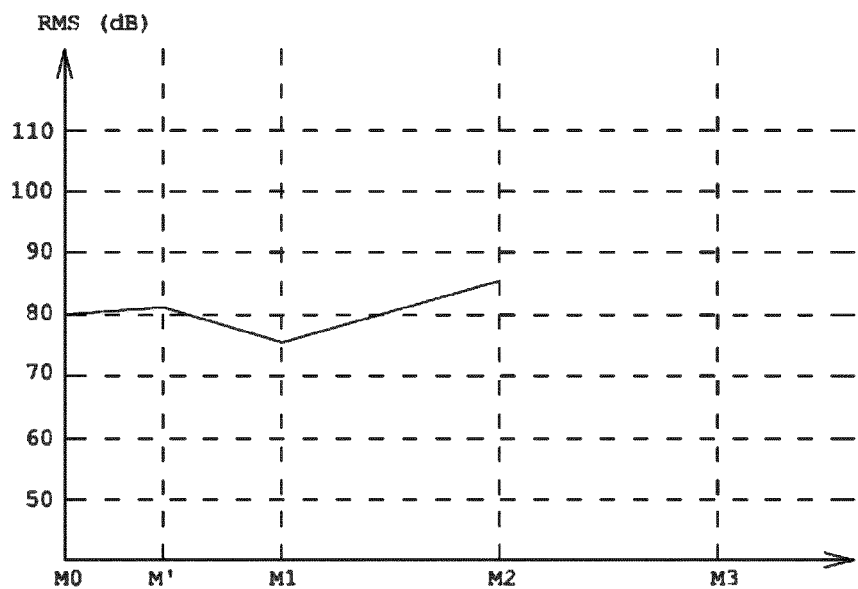
FIGS. 4a to 4d are examples of the measured RMS values converted in dBµV in a number of possible sequences according to the flowchart of FIG. 3.

With reference again to the flowchart in FIG. 3, an amount g2 equal to 0.15 G is supplied to the bearing following the outcome 'lubrication improved' or 'no change' after the g1-supply. Following the supply g2, a stabilization interval is allowed to elapse, and then a further ultrasound measurement M2 is acquired and stored, which is subsequently evaluated as follows:

If $\Delta_2$(=M0−M2)<0, the bearing condition is assessed as 'overlubricated'. In other words, when the RMS value M2 is higher than the initial RMS value M0, following a first value M1 more than 1 dB lower than or more or less equal to M0, the bearing is assessed as overlubricated, and the sequence is stopped, and preferably followed by a bearing inspection. This sequence is illustrated in FIG. 4a.

Figure 4B:
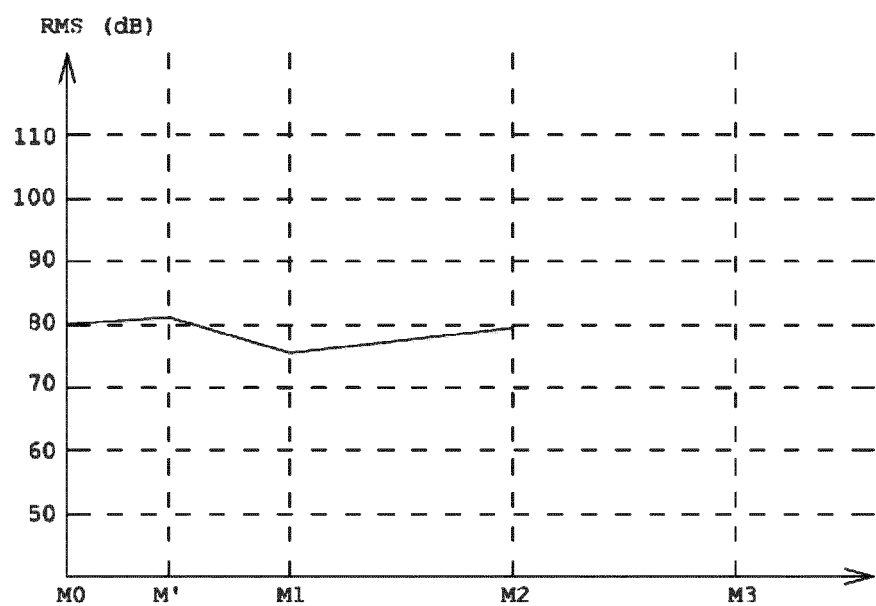

If the bearing is not overlubricated, the following condition is verified: '$\Delta_2$−$\Delta_1$<−1'. If this condition is fulfilled, the lubrication condition is assessed as 'lubrication success', and the sequence is stopped. In other words, when M2 (being lower than M0) is more than 1 dB higher than M1 after M1 is more or less equal to or at least 1 dB lower then M0, the lubrication condition is considered satisfactory. The condition 'lubrication success' is registered and the sequence is stopped. This sequence is illustrated in FIG. 4b.

Figure 4C:
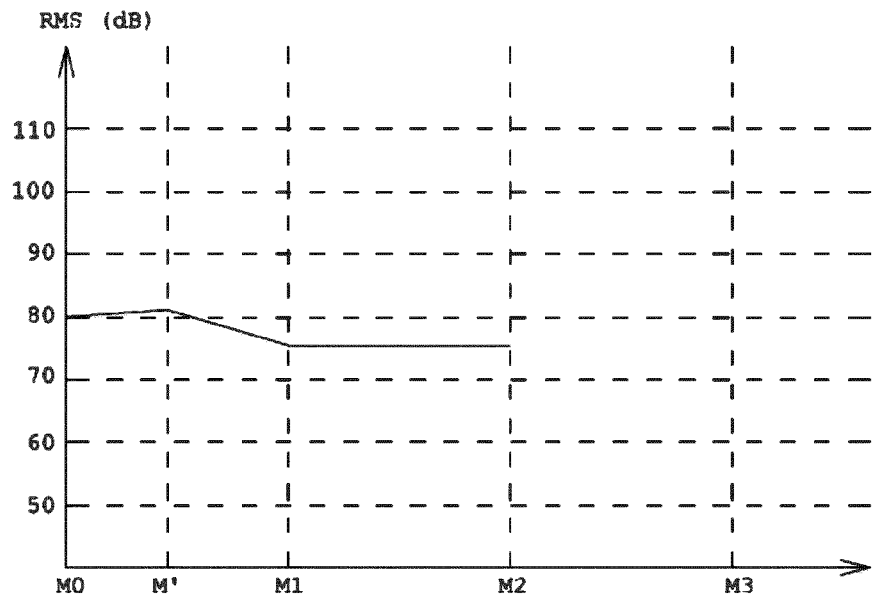
Figure 4D:
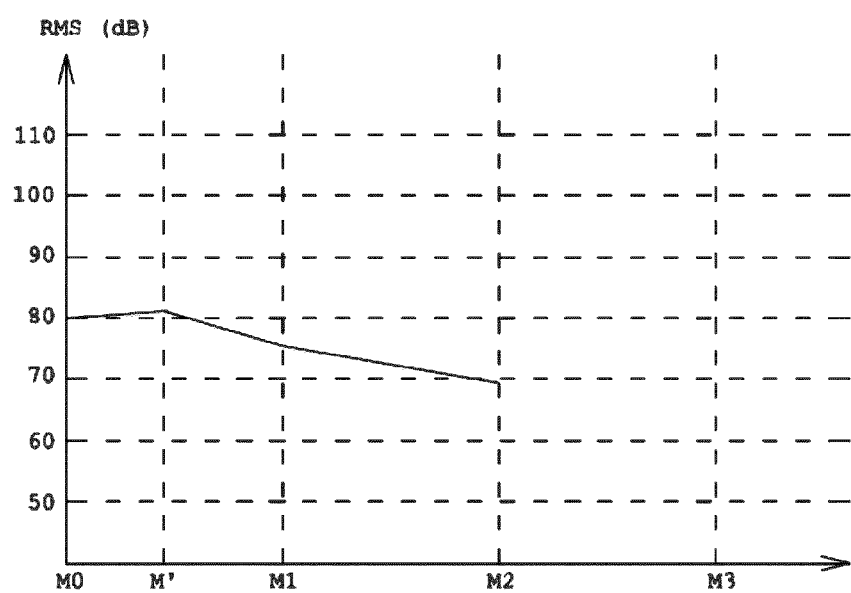

If '$\Delta_2$−$\Delta_1$<−1' is not fulfilled, the condition '−1≤$\Delta_2$−$\Delta_1$<1' is verified. If the latter condition is fulfilled, i.e. M2 is equal to or within 1 dB above or below M1, the condition is again stated as 'no change', and a further supply step is performed. This sequence is illustrated in FIG. 4c. If −1≤$\Delta_2$−$\Delta_1$<1 is not fulfilled, i.e. M2 is more than one dB lower than M1, the lubrication condition is assessed as 'improved', and the sequence is continued with a further supply g3(=0.1 G) and acquisition M3. This sequence is illustrated in FIG. 4d. After subsequent supplies of lubricant starting from g3, the evaluation is different according to the results of the previous steps, as explained hereafter. For example, three consecutive cases of status 'no-change' will lead to stopping the procedure.

Figure 5A:
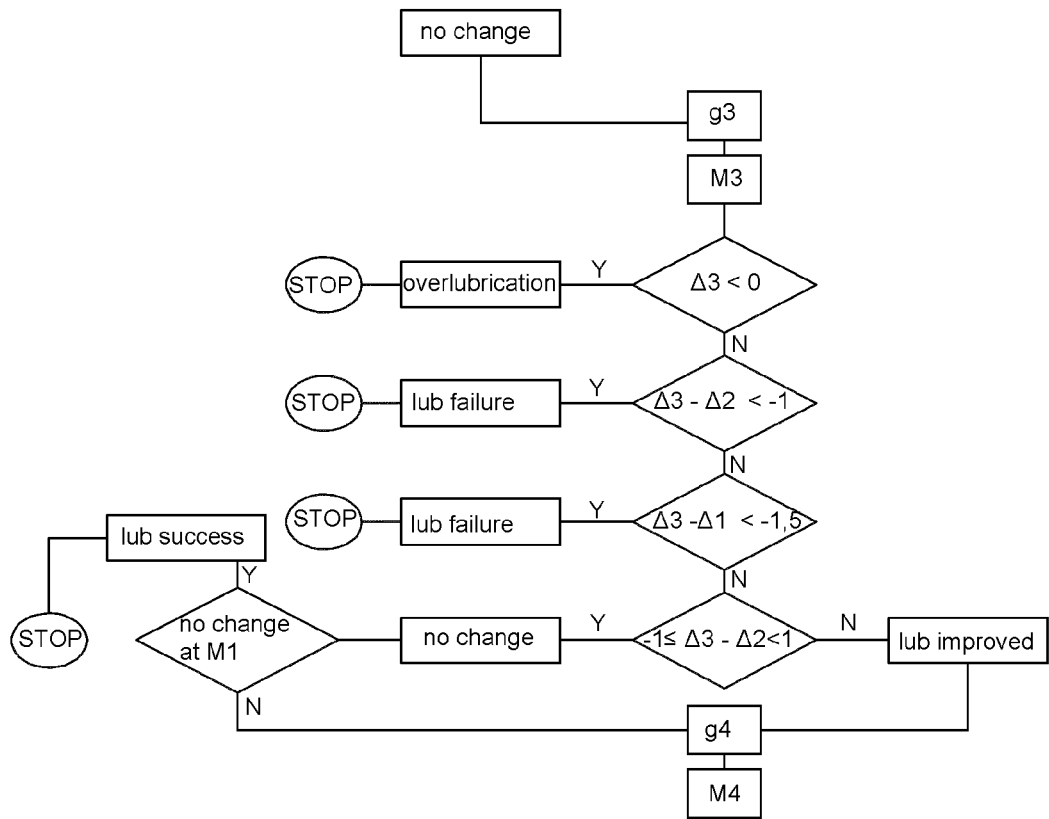
FIGS. 5a and 5b are flowcharts of the subsequent step following the chart of FIG. 3.
Figure 5B:
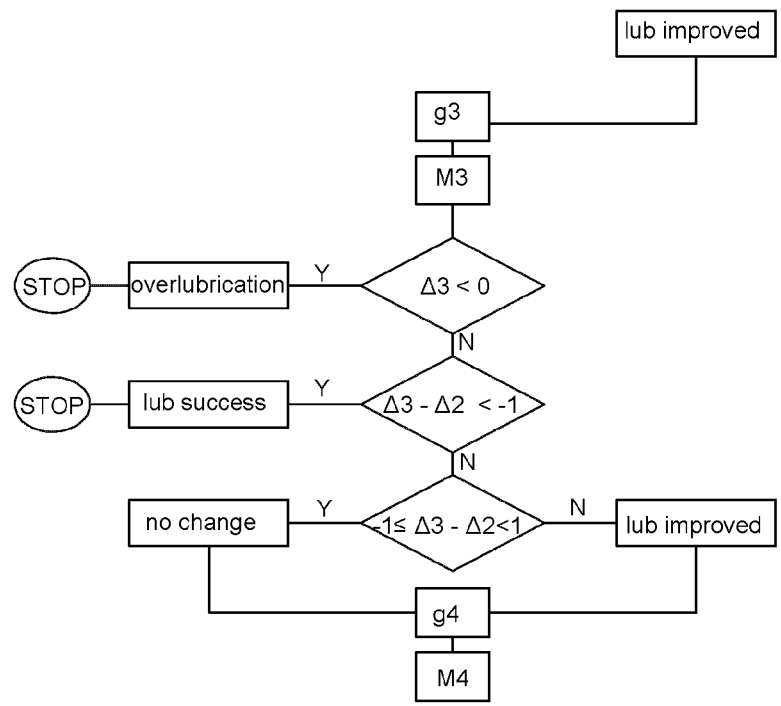

FIGS. 5a and 5b illustrate the next steps of the sequence. An amount g3=0.1 G is supplied and a stabilization time is allowed to elapse. Then a further RMS value M3 is acquired, and the assessment now depends on the results of the previous steps. FIG. 5a illustrates the flowchart that is applicable if g3 is added after a condition of 'no change' following g2.

Figure 6A:
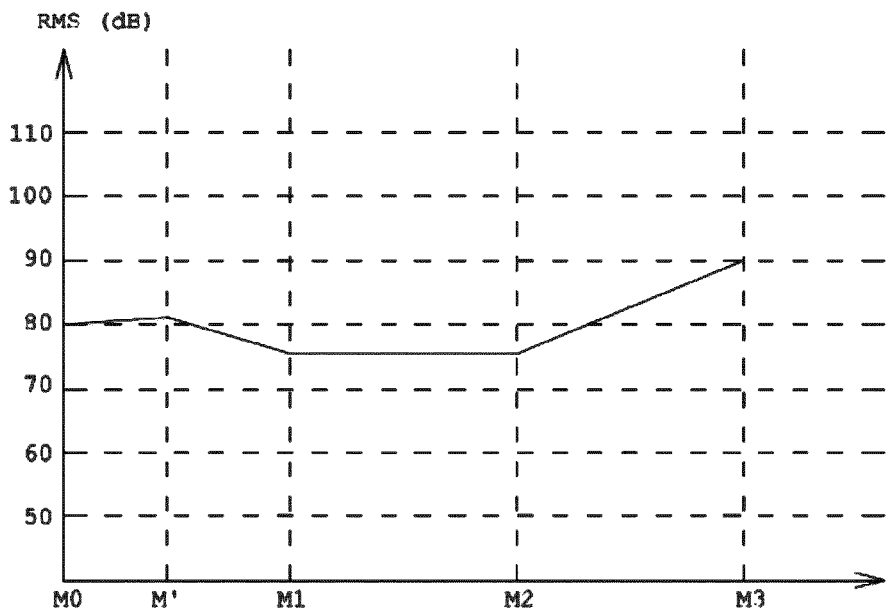
Figure 6B:
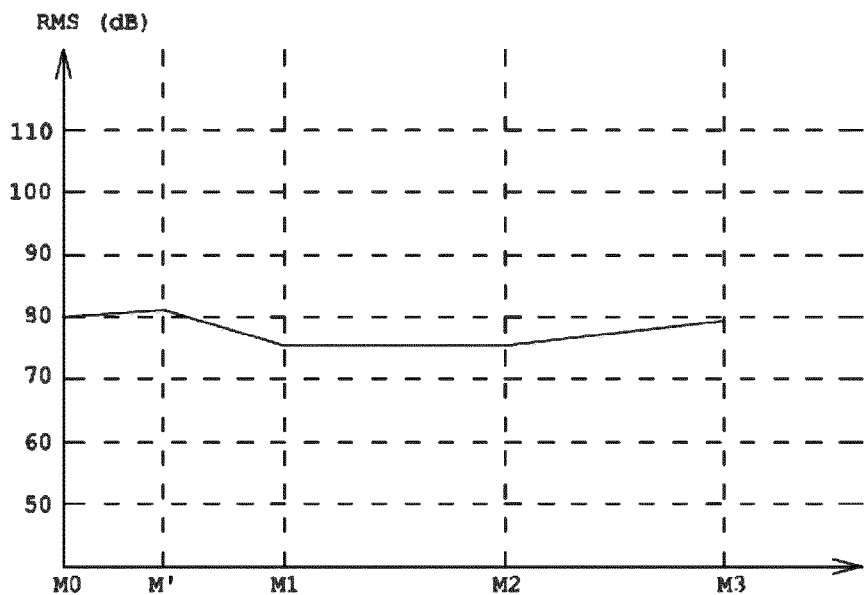

First, the condition '$\Delta_3$(=M0−M3)<0' is evaluated, i.e.: is M3 higher than M0? If the answer is yes, the lubrication condition is assessed as 'overlubricated' and the sequence is stopped, preferably followed by the inspection of the bearing. An example of this sequence is illustrated in FIG. 6a. If the answer is no, a further verification is made regarding the condition '$\Delta_3$−$\Delta_2$<−1', i.e. is M3 more than 1 dB higher than M2? If this is the case, i.e. a 'no change' after g2 is directly followed by a rise of more than 1 dB after g3, the lubrication condition of the bearing is assessed as 'lubrication failure'. An example of this sequence is illustrated in FIG. 6b. The sequence is stopped and the bearing is inspected. Qualitatively, this means that a 'no change' after the second supply g2 followed by a rise of more than 1 dB after the third supply, while M3 is still lower than M0 illustrates an abnormal bearing behaviour. The rise of the RMS indicates that the bearing is potentially operating too far into the HD region IV of the Stribeck curve at this point.

Figure 6C:
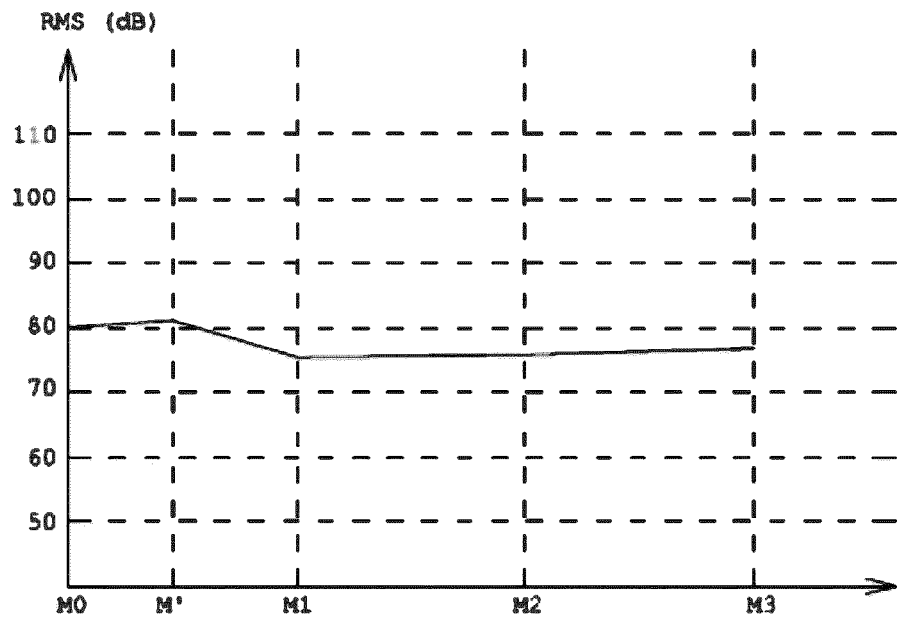

If '$\Delta_3$−$\Delta_2$<−1' is not true, an additional verification is made concerning the condition '$\Delta_3$−$\Delta_1$<−1.5', i.e. is M3, being lower than M0 and less than 1 dB higher than M2, more than 1.5 db higher than M1? If yes, the lubrication condition is assessed as 'failed' and the sequence is stopped. In other words, if the 'no change' after g2 is followed by a rise of more than 1.5 dB compared to M1, the lubrication condition is 'failed'. An example of this sequence is shown in FIG. 6c.

Figure 6D:
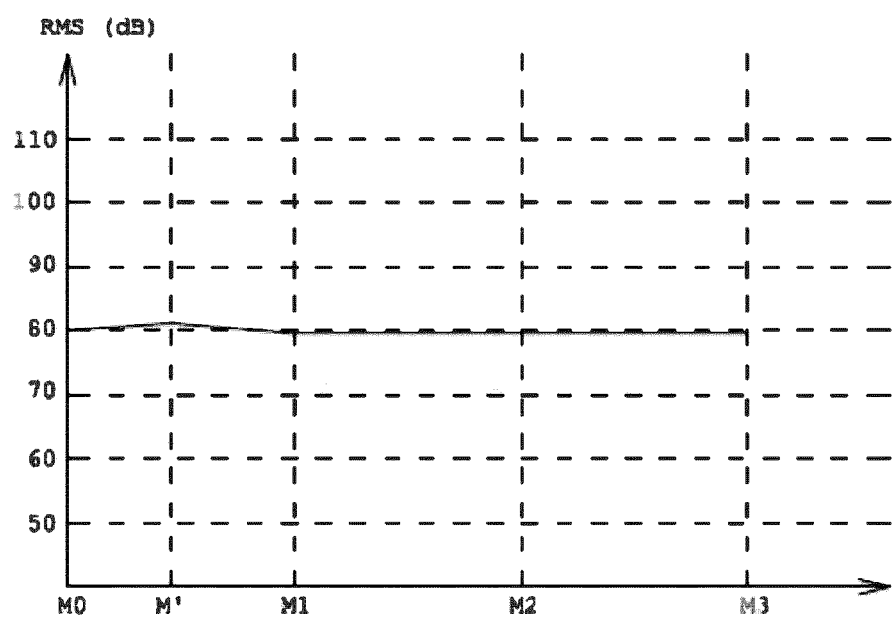
Figure 6E:
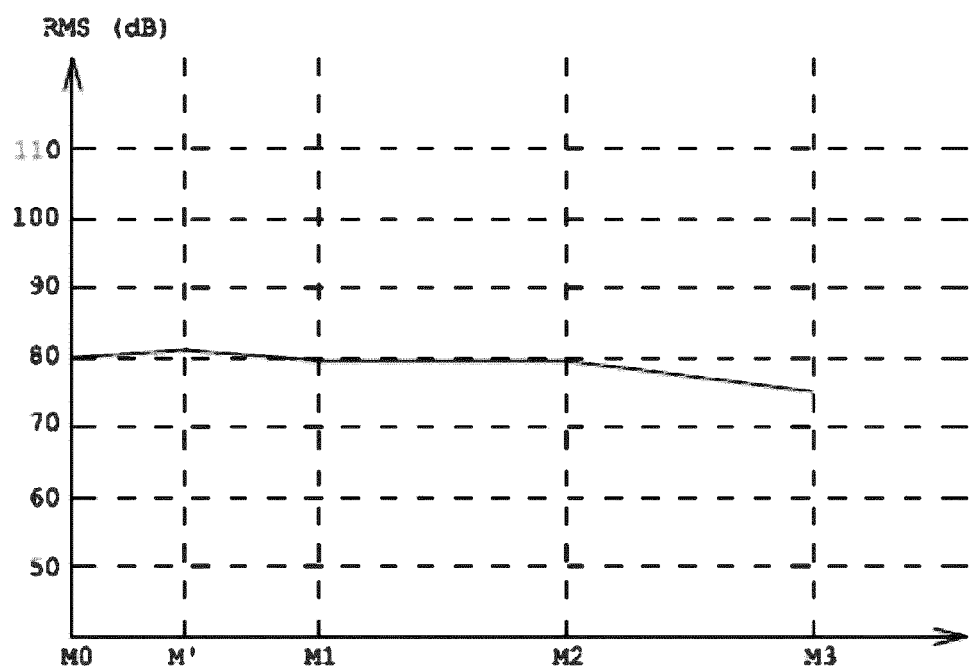

If '$\Delta_3$−$\Delta_1$<−1.5' is not true, i.e. M3 not more than 1.5 dB higher than M1 and M3 is also not more than 1 dB higher than M2, the condition '−1≤$\Delta_3$−$\Delta_2$<1' is assessed. If this condition is true, i.e. M3 is equal to or within 1 dB above or below M2, the lubrication condition is assessed as 'no change'. At this third stage however, an additional verification is made, namely whether or not this 'no change' is the third consecutive 'no change' condition that has been evaluated. If this is the case, it is found that the bearing condition is stable and acceptable, i.e. 'lubrication success' is recorded and the sequence is stopped. An example of this sequence is shown in FIG. 6d. It may be assumed at this point that the bearing has entered the EHD region and that this EHD region exhibits a very low rate of change of the friction coefficient. If not, i.e. when M3 is more than 1 dB lower than M2 following a 'no change' after g2, the lubrication condition is assessed as 'improved', and a further amount g4 is supplied. This sequence is illustrated in FIG. 6e.

FIG. 5b illustrates the flowchart that is applicable if g3 is added after a condition of 'lubrication improved'.

Figure 7A:
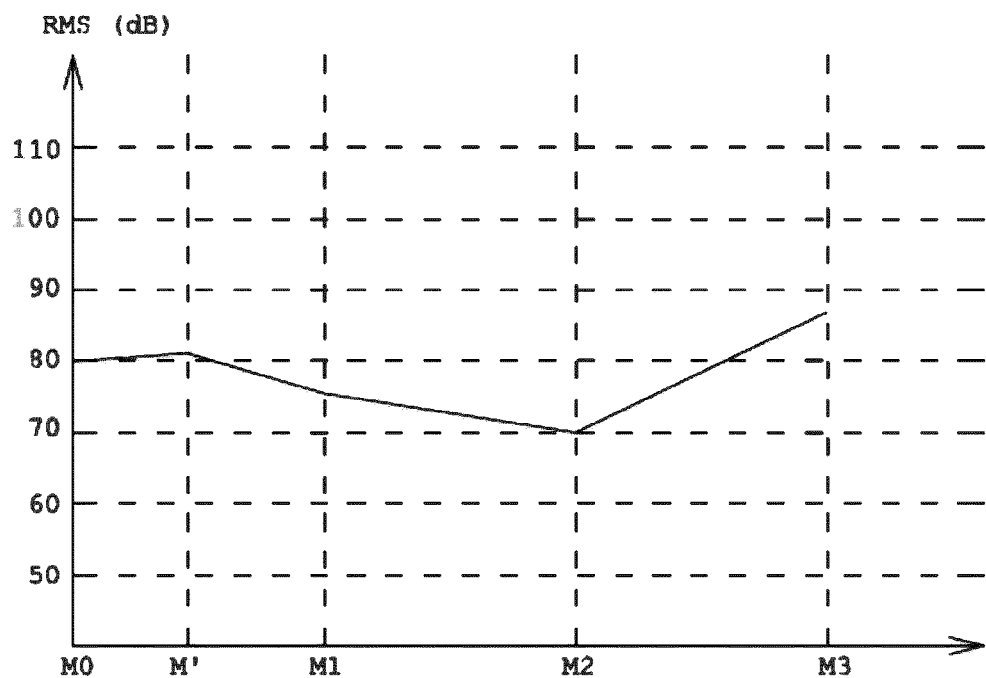
FIGS. 7a to 7d are examples of the measured RMS values in a number of possible sequences according to the flowcharts of FIG. 5b.
Figure 7B:
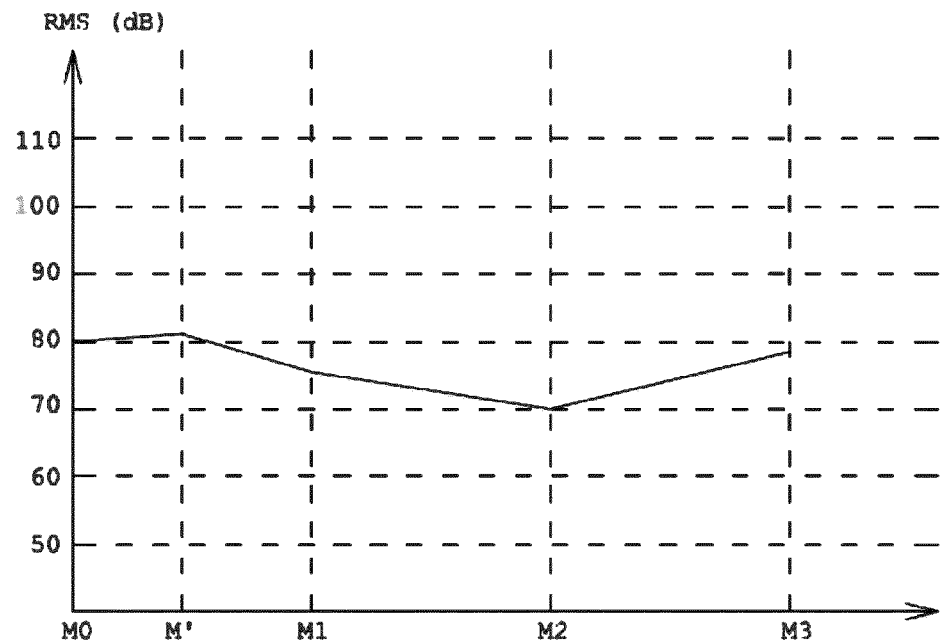

First, and as in the chart of FIG. 5a, the condition '$\Delta_3$(=M0−M3)<0' is evaluated, i.e.: is M3 higher than M0? If the answer is yes, the bearing is considered as overlubricated and the sequence is stopped, preferably followed by the inspection of the bearing. This sequence is illustrated in FIG. 7a. If the answer is no, the further verification is made regarding the condition '$\Delta_3$−$\Delta_2$<−1', i.e. is M3 more than 1 dB higher than M2? If this is the case, i.e. if the condition 'lubrication improved' after g2 (M2 more than 1 dB lower than M1) is followed by an increase of more than 1 dB (M3 is more than 1 dB higher than M2), the lubrication condition is assessed as 'lubrication success' and the sequence is stopped. An example of this sequence is illustrated in FIG. 7b. Qualitatively, this means that the bearing has entered the EHD regime, as determined by the rising trend following a downward trend in the previous step.

Figure 7C:
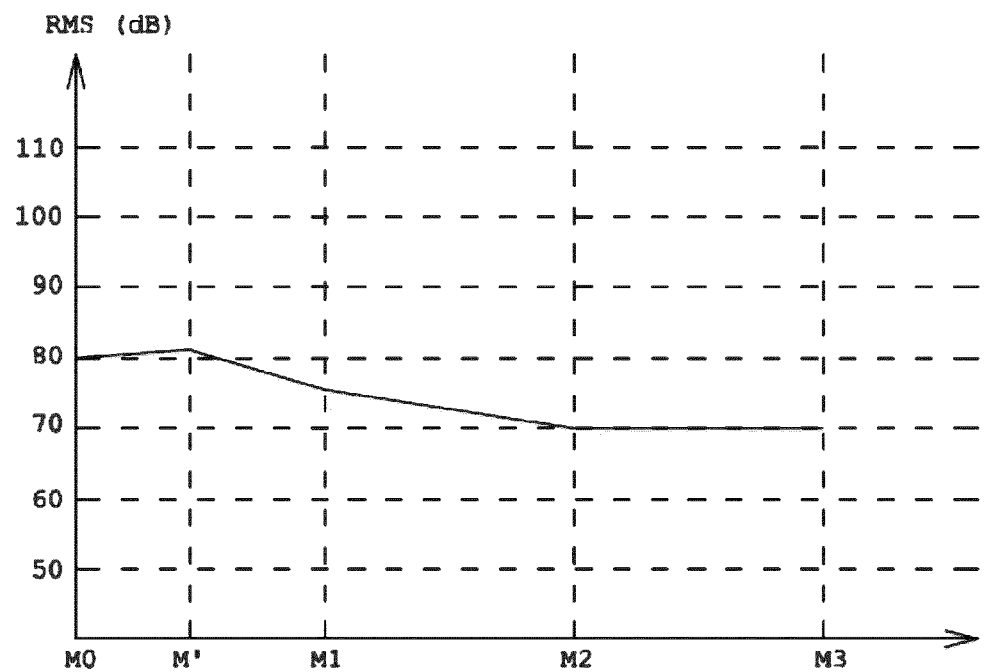
Figure 7D:
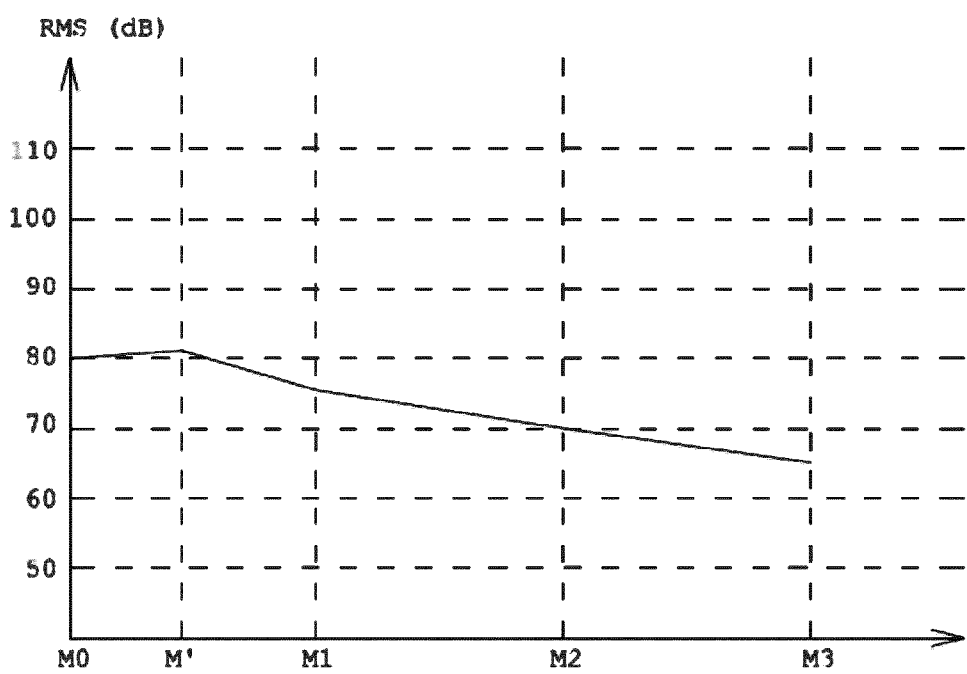

If '$\Delta_3$−$\Delta_2$<−1' is not true, i.e. M3 is not more than 1 dB higher than M2, the condition '−1≤$\Delta_3$−$\Delta_2$<1' is assessed. If this condition is true, i.e. M3 is equal to or within 1 dB above or below M2, the lubrication condition is assessed as 'no change'. Given the fact that the previous condition was 'lubrication improved', the 'no change' is not the third consecutive 'no change' condition. In this case, a further supply step g4 is performed. An example of this sequence is shown in FIG. 7c. If not, i.e. when M3 is more than 1 dB lower than M2 following a 'lubrication improved' after g2, the lubrication condition is assessed as 'improved', and a further amount g4 is supplied. An example is this sequence is shown in FIG. 7d.

Figure 8A:
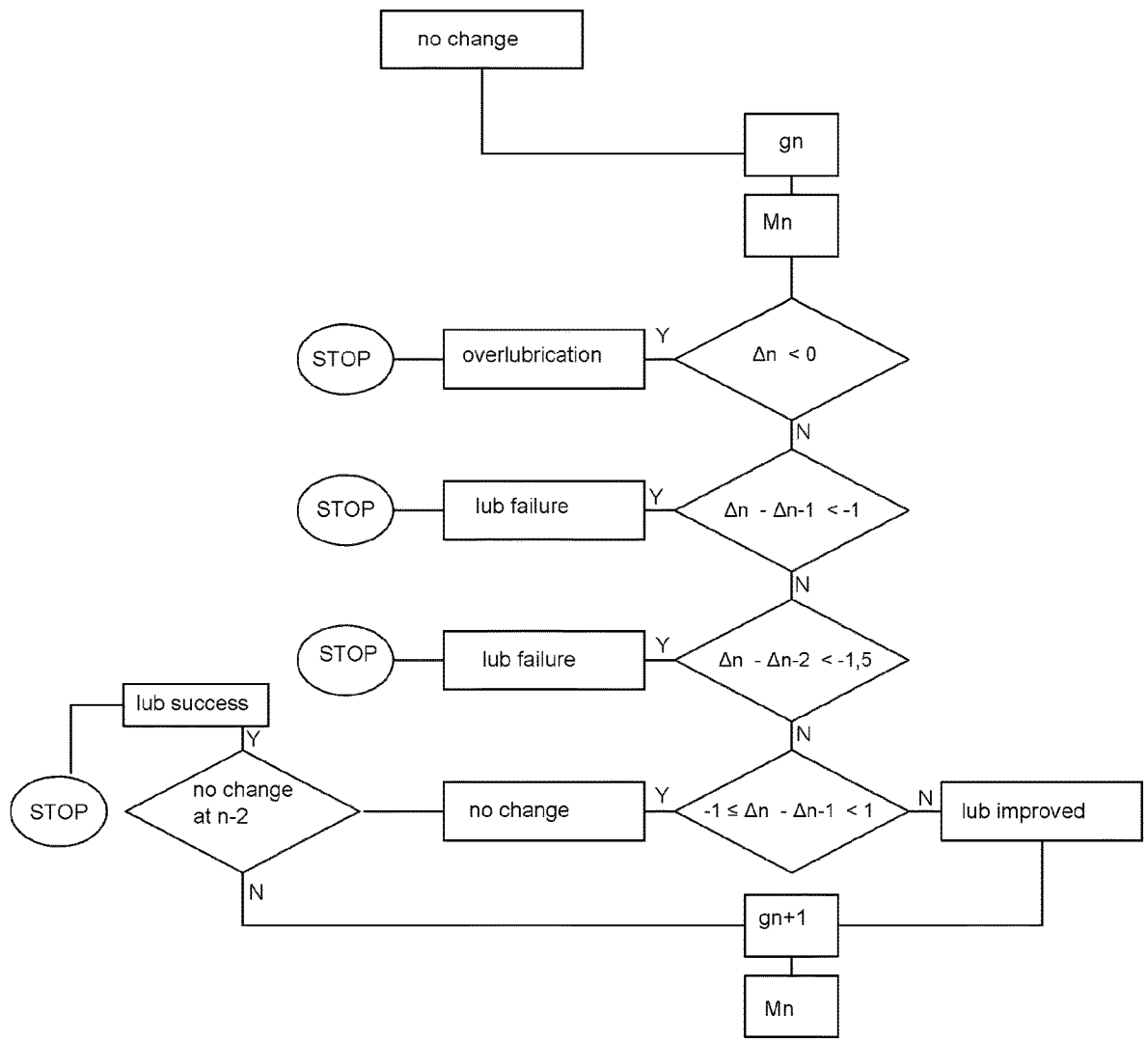
FIGS. 8a and 8b are generic flowcharts of the n-th step in a sequence of method steps applicable according to the invention.
Figure 8B:
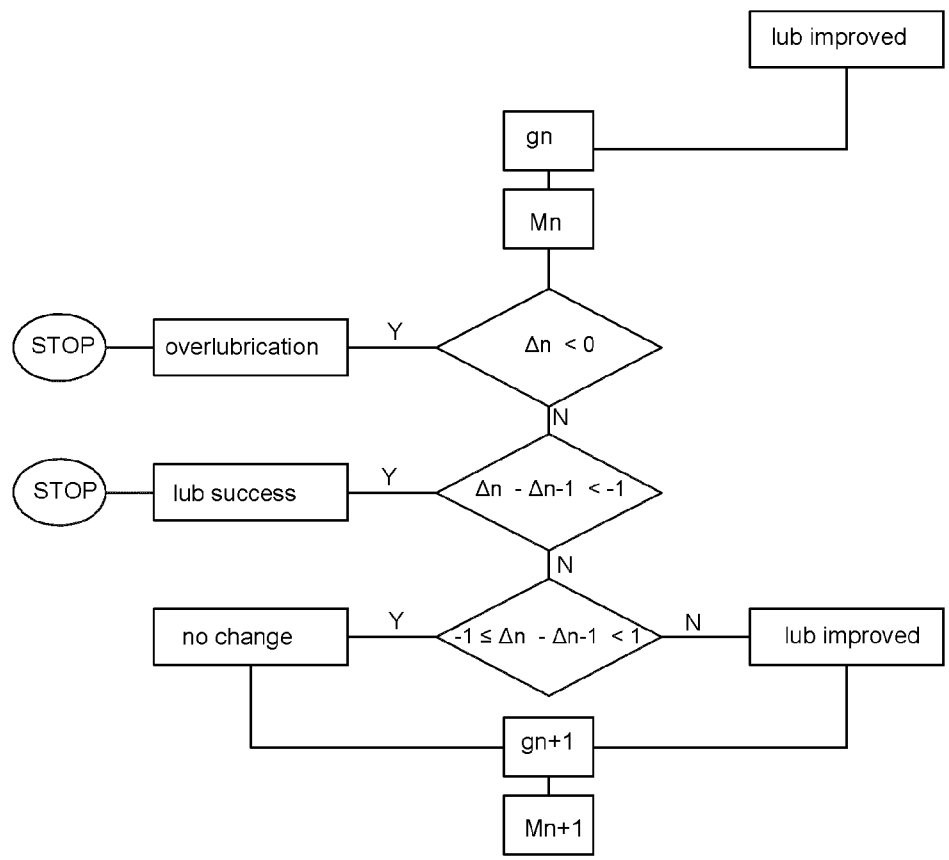

The sequences shown in FIGS. 5a and 5b may be generalized, resulting in the flowcharts shown in FIGS. 8a and 8b that describe the assessment of the measurement Mn in view of the result of the result of measurement Mn−1, for n≥3.

The decision tree algorithm always converges to a given end status, either 'lubrication success', 'lubrication failure' or 'overlubrication'. Looking at the graphs in FIGS. 4a to 4d, 6a to 6e and 7a to 7d, it is clear that for n≥3 a lubrication success is linked to a stabilization of the RMS through three consecutive supplies, or to a significant rise of the RMS following a preceding significant fall of the RMS. These conditions reflect the Stribeck curve, respectively when the bearing is in the EHD regime or when the bearing enters the EHD regime after a downward trend of the RMS in the mixed lubrication regime. The graphs which indicate a lubrication failure are related to a rise of the RMS after a preceding stabilization of the RMS, indicating that the bearing is entering the HD area which is not desirable for optimal operation of the bearing.

The stepwise supply of the lubricant thereby allows to assess the bearing condition in a much more detailed way compared to the supply of the full amount of G, so that a lubrication failure can be detected more effectively.

As stated, the above-described algorithm is but one example of a possible decision tree algorithm, and many details may vary with respect to the above-described sequences. For example, the sub-portions g1, g2 etc. may represent higher or lower percentages of the amount G, or the supply amounts may differ in a predefined way as a function of n.

Not all verification steps need to be included. For example, the additional verification of Δn−Δn−2<−1.5 could be omitted. Also, the intermediary measurement M' could be omitted.

An additional verification of the absolute level of M0 and preferably also M1 may be performed, before launching the sequence or the rest of the sequence. An alarm could be raised if M0 or M1 are outside a particular safety range around a predefined absolute level.

The lubricant amounts of g1=0.25 G, g2=0.15 G, gn=0.1 G for n≥3 represent a preferred sequence applicable to most lubricants such as for grease supplied to rolling element bearing. Other ratios of G may however be applied within the scope of the invention. In most cases, the method converges to a 'lubrication success' or 'failure/overlubrication' status before the sum of the supplied amounts reaches G. However, it is also possible that the sum of the supplied amounts surpasses G, indicating that the estimation of G has been too conservative. According to an embodiment, the replenishment interval T is shortened when it is determined that the method has not converged at n≥9.

Instead of or in addition to the RMS, other lubrication-related scalar indicators could be used in the method of the invention to strengthen the decision, such as $x_K$ (Kurtosis), defined as:

$$x_K = x_{(Kurtosis)} = \frac{\frac{1}{N}\sum_{k=1}^{N} x_k^4}{\left(\frac{1}{N}\sum_{k=1}^{N} x_k^2\right)^2} - 3$$

The precise criteria for assessing this scalar indicator at each step may be different compared to the assessment of the RMS.

As stated above, the method of the invention is especially suitable for being applied in a fully automated manner, by a smart automated lubrication system according to the invention. This may be a system as illustrated in FIG. 2, wherein the processing unit 6 is configured to perform the steps of the method automatically, i.e. to run through the decision tree algorithm and to perform the replenishment in an incremental manner until a state of 'overlubrication', 'lubrication success' or 'lubrication failure' is reached. In the first and the third case, the system may generate a signal or message for the bearing to be inspected or repaired. The system is configured to perform multiple replenishments at predefined intervals, for example separated by T seconds or lower. The system may also automatically recalculate the T-interval based on the results of the decision tree algorithm. The system may be comprise multiple transducers mounted permanently in contact with multiple bearings.

While the invention has been illustrated and described in detail in the drawings and foregoing description, such illustration and description are to be considered illustrative or exemplary and not restrictive. Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A method for monitoring and lubricating at least one rotary bearing of a machine, by incrementally supplying a lubricant to the bearing in one or several consecutive supply steps in a lubrication sequence, comprising:
    determining a prescribed lubricant amount,
    measuring an ultrasound signal before a first lubricant supply step using a transducer mounted in connection with the bearing, and obtaining an initial value of a scalar indicator extracted from the signal that is representative of the lubrication condition of the bearing, and said measurement and value extraction is repeated after each subsequent lubricant supply step,
    wherein each measurement is performed after a stabilization period following the lubricant supply, wherein the duration of the stabilization period being such that it allows the supplied lubricant to be fully operational,
    the amounts of lubricant supplied in the consecutive steps are smaller than the prescribed lubricant amount,
    starting with a second extracted value, each value of the scalar indicator is evaluated, with respect to the initial value, and, starting from a third measurement, with respect to one or more of the previously extracted values,
    based on each of the evaluations, a decision is made about stopping or continuing the lubrication sequence.

2. The method according to claim 1, wherein the scalar indicator is the root mean square (RMS) of the signal.

3. The method according to claim 2, wherein the lubrication sequence is continued when an extracted value is significantly lower than the previously extracted value.

4. The method according to claim 2, wherein the lubrication sequence is continued when an extracted value is essentially the same as the previously extracted value, unless the extracted value has remained the same for a given number of consecutive measurements and value extractions, in which case the lubrication sequence is stopped and the lubrication condition is considered successful.

5. The method according to claim 2, wherein the lubrication sequence is stopped due to overlubrication when an extracted value is higher than or at least a given amount higher than the initial value.

6. The method according to claim 2, wherein the lubrication sequence is stopped due to a successful lubrication condition when an extracted value is significantly higher than the previous value, after said previous value was significantly lower than the value preceding said previous value.

7. The method according to claim 2, wherein the lubrication sequence is stopped due to a failed lubrication condition when an extracted value is significantly higher than the previous value, after said previous value was essentially the same as the value preceding said previous value.

8. The method according to claim 2, further comprising an intermediate measurement of an ultrasound signal during the stabilization time after the first lubricant supply step, and before the first extraction of the scalar indicator value, and comprising the extraction of a value of the scalar indicator from the intermediate signal, and wherein the lubrication sequence is stopped due to a suspected bearing failure if the value M' is significantly lower than the initial value, whereas the first extracted value is significantly higher than the intermediately extracted value.

9. The method according to claim 8, wherein the scalar indicator or an additional scalar indicator is the Kurtosis.

10. The method according to claim 2, further comprising determining of a replenishment interval.

11. The method according to claim 10, wherein the replenishment interval is updated between subsequent applications of the lubrication method, and wherein the update is based on the results of the steps of the lubrication method.

12. The method according to claim 11, wherein a shorter replenishment interval is applied when it is determined that a higher total amount of lubricant than the prescribed amount is required before the lubrication sequence is stopped.

13. The method according to claim 10, is performed multiple times at intervals equal to or shorter than the replenishment interval.

14. The method according to claim 1, wherein the method is fully automated.

* * * * *